United States Patent
Chen et al.

(10) Patent No.: US 7,246,029 B2
(45) Date of Patent: Jul. 17, 2007

(54) ELECTRIC MACHINE WITH ACTIVELY CONTROLLED SWITCHES

(75) Inventors: Hanyang B. Chen, Ypsilanti, MI (US); Mark J. Pillote, Ann Arbor, MI (US)

(73) Assignee: f;Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/936,963

(22) Filed: Sep. 9, 2004

(65) Prior Publication Data
US 2006/0052976 A1    Mar. 9, 2006

(51) Int. Cl.
*G01C 9/00*    (2006.01)
(52) U.S. Cl. .................................... 702/151
(58) Field of Classification Search ............. 702/151; 310/156.69
See application file for complete search history.

(56) References Cited

U.S. PATENT DOCUMENTS

| | | | |
|---|---|---|---|
| 4,654,566 A | 3/1987 | Erdman | |
| 5,206,567 A | 4/1993 | Sakurai et al. | |
| 5,569,990 A * | 10/1996 | Dunfield | 318/254 |
| 5,642,021 A | 6/1997 | Liang et al. | |
| 5,679,997 A | 10/1997 | Matsuzawa et al. | |
| 5,717,299 A | 2/1998 | Inagaki et al. | |
| 5,726,543 A | 3/1998 | Park et al. | |
| 5,739,652 A | 4/1998 | Sriram | |
| 5,751,125 A | 5/1998 | Weiss | |
| 5,859,520 A | 1/1999 | Bourgeois et al. | |
| 5,990,642 A | 11/1999 | Park | |
| 5,990,643 A | 11/1999 | Holling et al. | |
| 6,081,084 A | 6/2000 | Crecelius | |
| 6,172,498 B1 * | 1/2001 | Schmidt et al. | 324/207.12 |
| 6,218,795 B1 | 4/2001 | Syukuri | |
| 6,351,094 B1 | 2/2002 | Green | |
| 6,353,307 B1 | 3/2002 | Koelle et al. | |
| 6,396,237 B2 | 5/2002 | Mayes | |
| 6,462,491 B1 | 10/2002 | Iijima et al. | |
| 6,577,085 B2 | 6/2003 | Maurice et al. | |
| 6,642,681 B2 | 11/2003 | Kawabata et al. | |
| 6,699,081 B2 | 3/2004 | Divljakovic et al. | |
| 2002/0003412 A1 | 1/2002 | Takayama et al. | |
| 2002/0079860 A1 * | 6/2002 | Seki et al. | 318/727 |
| 2002/0084773 A1 | 7/2002 | Nishimura et al. | |
| 2002/0097014 A1 | 7/2002 | Kawagoshi | |
| 2002/0117989 A1 | 8/2002 | Kawabata et al. | |
| 2002/0171388 A1 * | 11/2002 | Seki | 318/727 |
| 2003/0001545 A1 * | 1/2003 | Koelle et al. | 322/37 |
| 2004/0004455 A1 | 1/2004 | Fujimoto et al. | |
| 2004/0056628 A1 | 3/2004 | Kandori | |
| 2005/0283324 A1 * | 12/2005 | Swanson | 702/57 |
| 2006/0097674 A1 * | 5/2006 | Nishihara et al. | 318/254 |

* cited by examiner

*Primary Examiner*—John Barlow
*Assistant Examiner*—Demetrius Pretlow
(74) *Attorney, Agent, or Firm*—Brinks Hofer Gilson & Lione

(57) ABSTRACT

A system, for determining a starting position angle of an electric motor, includes a plurality of windings, a circuit, a processor, and at least one voltage sensor. The circuit is configured to create a pulse current field in at least one of the plurality of windings. The sensor is configured to sense a pulse current field response in a corresponding winding of the plurality of windings. The processor is in communication with the voltage sensor and is configured to determine the position angle of the rotor based on the pulse field response.

13 Claims, 4 Drawing Sheets

ELECTRIC MACHINE WITH ACTIVELY CONTROLLED SWITCHES

BACKGROUND

1. Field of the Invention

The present invention generally relates to a system for determining a starting position angle for a rotor of a DC motor.

2. Description of Related Art

Actively controlled power electronic switches (such as MOSFETs', IGBTs', SCRs', etc.) can substantially improve the performance of some alternators and motors. MOSFETs' have been employed in a variety of rectifier designs for automotive alternator applications. When switches are used in an alternator rectifier, the firing of the switches can be manipulated in such a way that the alternator can function as a DC motor to start the vehicle engine. The electric machine used both as starter and alternator in a vehicle is called alternator/starter. It can be used to implement the stop/start feature of a vehicle and this feature can substantially improve the overall fuel efficiency of a vehicle.

When electric switches, such as MOSFETs', are used for controlling an electric machine, detection of the rotor angle position forms an integral part of the control algorithm. Current in each phase of the machine is controlled by the MOSFETs' based on rotor angle position. Traditionally, external rotor angle position sensors, such as, optical encoders, Hall-effect magnetic sensors, and resolvers, are used to directly detect the angular position of the rotor. Unfortunately, these sensors are often expensive, temperature sensitive, and difficult to package within an alternator. A sensorless control approach can provide increased power density while minimizing the cost of the machine.

Sensorless techniques typically monitor phase back EMF, phase terminal voltages, or phase currents in order to determine the rotor angle position. When the electric machine is not spinning, pre-existing sensorless techniques are not adequate for determining the rotor position.

In most DC motor applications utilizing sensorless techniques, the rotor is pre-positioned to a known rotor angle position by energizing particular windings of the electric machine. With the rotor in a known position, standard 6-step control process is implemented to drive the electric machine. If the rotor is pre-rotated to a known position, the pre-rotated angle could be clockwise, or counter-clockwise, depending on the initial rotor angle position.

When the alternator function as a vehicle starter (DC motor), the alternator rotor starts at an arbitrary angle. Because the alternator is connected to the engine crankshaft through a drive belt and since the engine can only rotate in one direction, the alternator must turn the drive belt in only one direction. For example, a clockwise direction assuming the engine normal operation direction is clockwise. The present sensorless techniques for pre-positioning the rotor cannot ensure a clockwise rotation to the known position.

In view of the above, it is apparent that there exists a need for an improved system for determining a starting position angle of an electric motor.

SUMMARY

In satisfying the above need, as well as overcoming the enumerated drawbacks and other limitations of the related art, the present invention provides a system for determining a starting position angle of an electric motor.

The system includes a plurality of windings, a circuit, a processor, and at least one voltage sensor. The circuit is configured to create a pulse field in at least one of the plurality of windings. The processor is in communication with the voltage sensor and is configured to determine the position angle of the rotor based on the pulse field response. The voltage sensor is configured to sense a pulse field voltage response in a corresponding winding of the plurality of windings. The voltage sensor that is required need only measure the differential voltage across the windings. For example, this voltage sensor could be a differential amplifier circuit built-in the controlling circuit board. When this system is used to determine the initial rotor angle position, there is no rotor angle sensor mounted in the machine to directly detect the rotor angle position. Therefore, this DC motor control approach is still considered a sensorless technology.

In another aspect of the present invention, the pulse field is created in a stator winding and the pulse field response is sensed in a rotor winding.

In another aspect of the present invention, the pulse field generated in a rotor winding and the pulse field response is sensed in at least one of the stator winding.

In another aspect of the present invention, the pulse field is created in one stator winding and the pulse field responses are sensed in other stator windings.

In another aspect of the present invention, the processor is configured to determine the position angle of the rotor based on the relationship $F\_A = I\_field * L\_FA = I\_field * L * \sin(theta)$, $F\_B = I\_field * L\_FB = I\_field * L * \sin(theta - 120°)$, $F\_C = I\_field * L\_FC = I\_field * L * \sin(theta - 240°)$, where: $F\_A, F\_B, F\_C$ are flux linkage of phase A, B, C; $L\_FA, L\_FB, L\_FC$ are mutual inductances between rotor coil and phase A, B, C; $I\_field$ is rotor coil field current; $L$ is a constant; theta is the rotor angle position.

Further objects, features and advantages of this invention will become readily apparent to persons skilled in the art after a review of the following description, with reference to the drawings and claims that are appended to and form a part of this specification.

DETAILED DESCRIPTION

Figure 1:
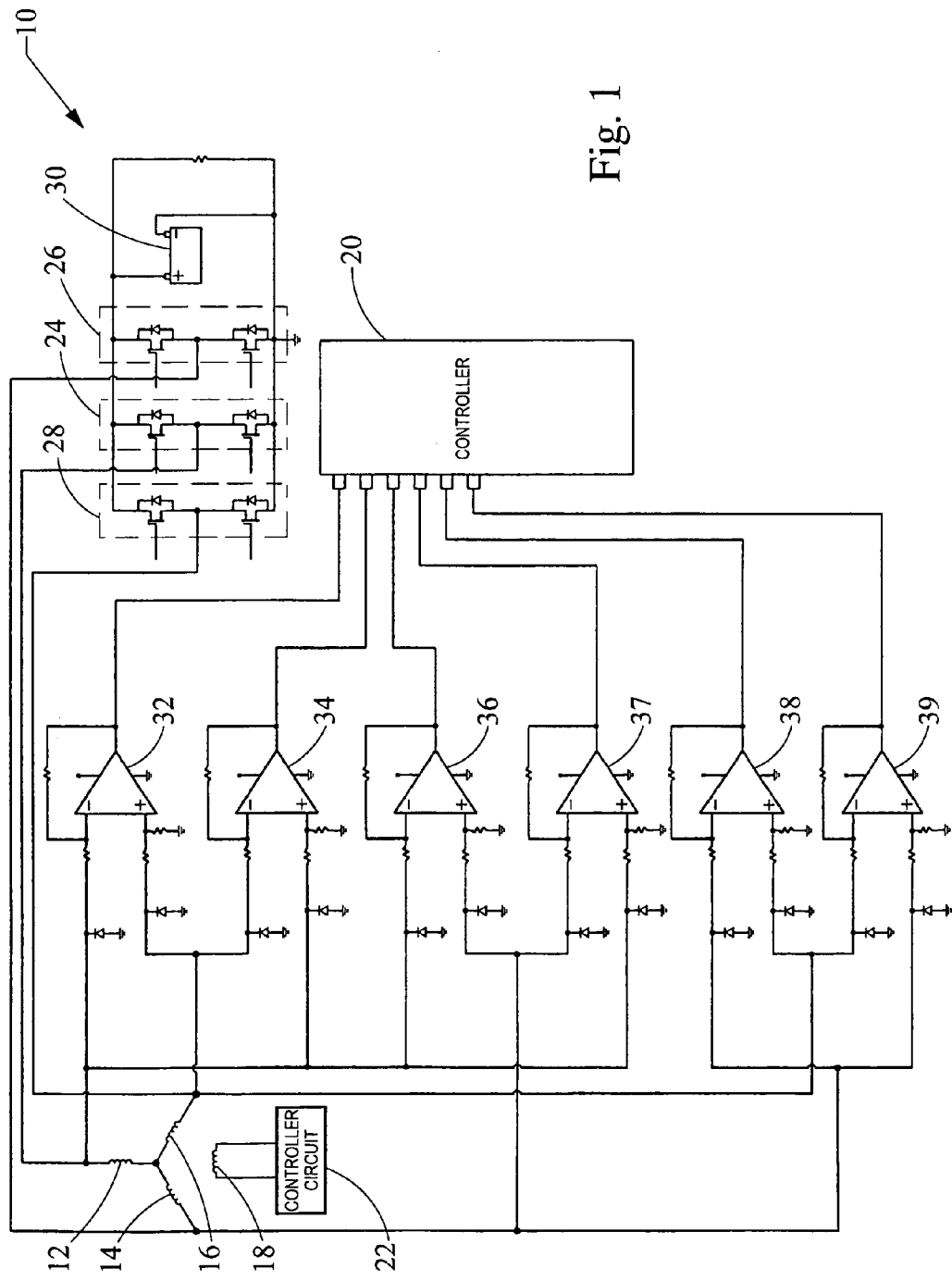
FIG. 1 is a schematic view of the electric motor and a system for determining a stroke position angle in accordance with the present invention.

Referring now to FIG. 1, a system embodying the principles of the present invention is illustrated therein and designated at 10. As its primary components, the system 10 includes a plurality of windings including stator windings 12, 14, 16 and a rotor winding 18. Further, the system 10 may comprise a claw-pole electric machine.

For the three phase machine shown, each stator winding 12, 14, 16 is connected to a corresponding switching circuit 24, 26, 28. Each of the switching circuits 24, 26, 28 are connected to a battery 30 to supply electrical power and energize the stator windings 12, 14, 16. Each of the gate switching circuits 24, 26, 28 is configured to sequentially energize its corresponding stator winding 12, 14, 16 to drive the motor. When a pulse current is applied in the rotor winding and the voltages V AB, V BC, and V CA are measured, all Vgs (gate to source voltage) of switchers 24, 26, 28 are set to be zero and these switchers are in open condition. Therefore, the stator windings have very high output impedances and the measured V AB, V BC, and V CA are induced voltages which satisfy equations (1) to (3) listed below. Typically the shape and magnitude of the pulse current is selected so that the maximum induced voltages V AB, V BC, and V CA are less than 1 volt.

Figure 2:
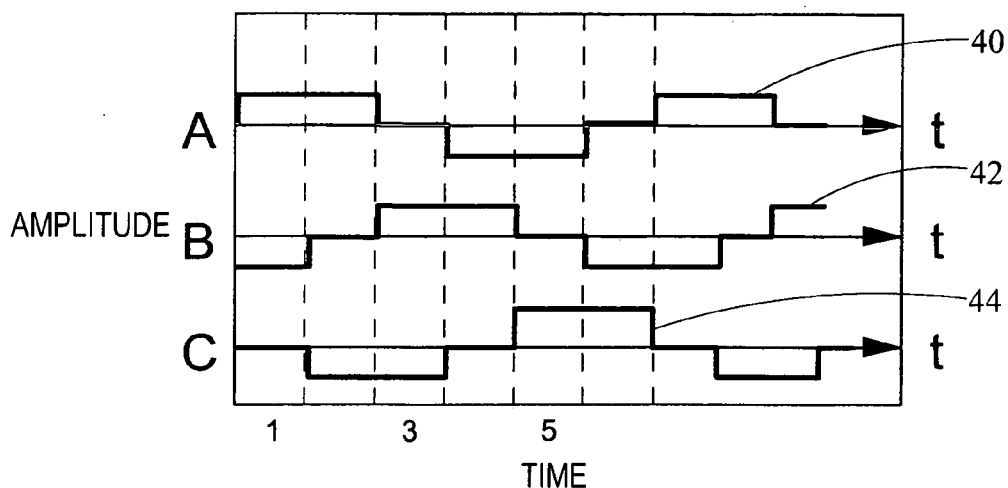
FIG. 2 is a timing diagram of a six step start-up process for an electric motor.

Now referring to FIG. 2, a six-step start-up process for a three phase machine is provided. Line 40, 42, and 44 represent the conducting states of the switch circuits 24, 26, and 28. Line 40 being representative of phase A, line 42 being representative of phase B, and line 44 being representative of phase C of the three-phase machine. In a standard six-step control procedure, a whole period of the six-step is 360 electric degrees, (corresponding to 360/N rotor mechanical degrees for an electric machine with N-pair North and South poles in rotor). It is the electric angle that is used to control the status of each switch in a six-step control procedure. For an electric machine with one pair of rotor poles, the electric angle equals to the rotor mechanical angle. But for an electric machine with N pairs of rotor poles, the electric angle equals the mechanical angle times N.

Before the start-up process can begin, the initial rotor position must be determined, thereby allowing the corresponding step of the process to be initiated. When the rotor is stationary, a pulse of current is provided to rotor winding 18 from a controller circuit 22. The resulting phase voltages in the stator windings 12, 14, 16 are measured. The induced voltages in the stator windings 12, 14, 16 are functions of rotor angle and are proportional to the mutual inductances between rotor winding 18 and each of the stator windings 12, 14, 16. Rotor angle position can be determined based on these induced voltages according to the following relationship.

$$F\_A = I\_field * L\_FA = I\_field * L * P(theta) \quad (1)$$

$$F\_B = I\_field * L\_FB = I\_field * L * P(theta-120°) \quad (2)$$

$$F\_C = I\_field * L\_FC = I\_field * L * P(theta-240°) \quad (3)$$

Where:

F_A, F_B, F_C are flux linkage of phase A, B, C;

L_FA, L_FB, L_FC are mutual inductances between rotor winding and phase A, B, C;

I_field is rotor winding field current;

L is a constant;

theta is the rotor angle position;

P is a periodic function of angle with a period equal to 360 electric degrees. For an ideal 3-phase motor P=sin, a sinusoidal function.

Equations (1) to (3) present the relationship between the stator winding flux linkages and the corresponding electric angle of the rotor initial position for an ideal 3-phase motor.

Imposing a pulse current in the rotor winding 18 without rotor motion will induce voltages in stator phases according to the relationship:

$$V\_A = d(I\_field)/dt * L * P(theta) \quad (4)$$

$$V\_B = d(I\_field)/dt * L * P(theta-120°) \quad (5)$$

$$V\_C = d(I\_field)/dt * L * P(theta-240°) \quad (6)$$

Where V_A, V_B, and V_C are measured voltages. From equations (4) to (6), the rotor angle theta can be uniquely derived. In ideal condition, P is a sinusoidal function and there is an analytical solution of equations (4) to (6) for the rotor angle theta. When P is not a sinusoidal function, then numerical approaches can be implemented to determine theta.

Accordingly, amplifiers 32, 34, 36, 37, 38 and 39 are configured to provide signals representative of inductance voltage between the stator windings 12, 14, 16 to a controller 20, such as a digital signal processor (DSP). The controller 20 is used to determine the rotor angle from equations (4) to (6).

Amplifier 32 is connected to stator winding 12 and stator winding 16 to produce a signal representative of the inductive voltage therebetween. Amplifier 34 is connected to stator winding 16 and stator winding 12 to generate a signal representative of the inductance voltage therebetween, in a polarity opposite of amplifier 32. Similarly, amplifier 36 and amplifier 37 are connected, in an opposite polarity, between stator winding 12 and stator winding 14 used to provide a signal representative of the inductance voltage between stator winding 12 and stator winding 14. To provide a signal representative of the inductance voltage between stator winding 14 and stator winding 16, amplifier 38 and amplifier 39 are connected in opposite polarities across stator winding 14 and stator winding 16.

For cost consideration, the controller 20, may be an 8-bit microcontroller. Since mutual inductances between the rotor winding 18 and stator windings 12, 14, 16 are not perfect sinusoid functions, a suitable method for an 8-bit controller is to use a look-up table and simple logic comparison to determine the initial rotor angle position from the induced stator winding voltages. Once initial rotor position is known, the 6-step process described above is initiated to control the switches for 3-phase machines.

For a 3-phase machine with a wye connection, the line-to-line induced voltages V_AB, V_BC, and V_CA are measured. Table One provides a look-up table, which is derived from the principle described above. When induced voltages V_AB, V_BC, and V_CA are provided, the control step in FIG. 2 can be determined.

TABLE ONE

Control Step Look-up table for 3-phase machine

| Condition | Control Step |
| --- | --- |
| V_BC > V_AB > V_CA | 1 |
| V_BC < V_AB < V_CA | 4 |
| V_CA > V_BC > V_AB | 3 |
| V_CA < V_BC < V_AB | 6 |
| V_AB > V_CA > V_BC | 5 |
| V_BC < V_CA < V_BC | 2 |

Only simple logic comparisons are required to obtain results in Table One. An 8-bit microcontroller can quickly process these comparisons for real time controlling. With the results of the comparison, Table One is used to determine an initial control step, such that, the rotor will not be forced to rotate in wrong direction prior to crank. By adding additional logic comparison, the initial rotor angle position can be derived with increased accuracy.

Figure 3:
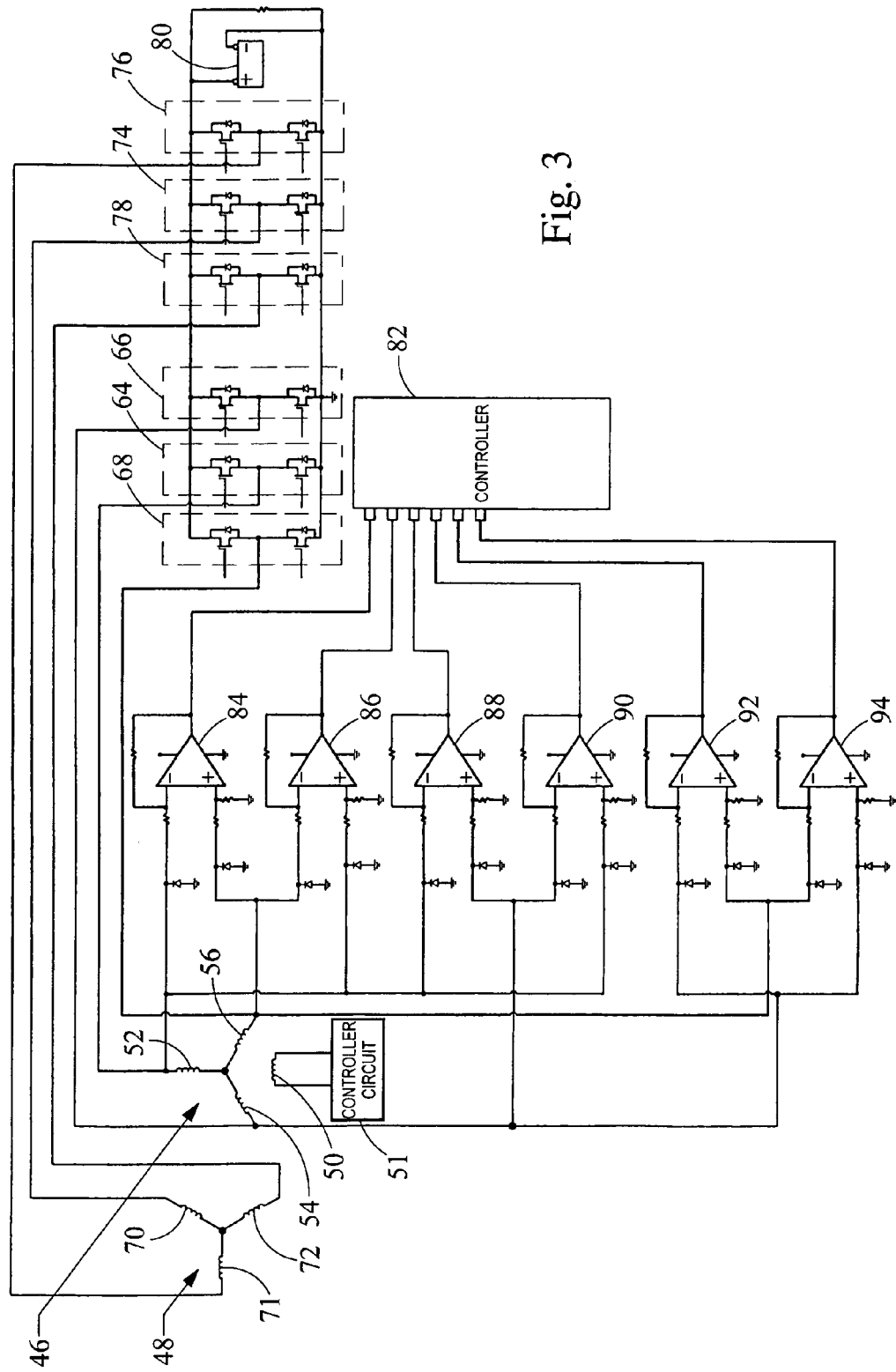
FIG. 3 is a schematic view of a six phase electric motor and a system for determining a start position angle of the electric motor.

Now referring to FIG. 3, a stator winding connection with switches for a 6-phase dual wye machine is provided. The dual wye machine includes two groups of stator windings, a first wye configuration 46 and a second wye configuration 48. These two winding groups 46, 48 are shifted electrically by 30 degrees due to a slot angle difference in the stator core. The first wye configuration 46 includes phase A, phase B, and phase C; while the second wye configuration 48 includes phase A', phase B', and phase C'. Phase A' has a 300 phase shift with respect to phase A, phase B' has a 30° phase shift with respect to phase B, and phase C' has a 30° phase shift with respect to phase C.

Each stator winding 52, 54, 56, 70, 71, 72 is connected to a corresponding switching circuit 64, 66, 68, 74, 76, 78. Each of the switching circuits 64, 66, 68, 74, 76, 78 are connected to a battery 80 to supply electrical power and energize the stator windings 52, 54, 56, 70, 71, 72. Each of the switching circuits 64, 66, 68, 74, 76, 78 is configured to sequentially energize its corresponding stator winding 52, 54, 56, 70, 71, 72 to drive the motor.

To initiate control of the switching circuits, the position of the stationary rotor relative to the 3-phase-stator winding must be determined. The rotor winding 50 is provided a current pulse from a controller circuit 51. The resulting voltages in the stator windings 52, 54, 56 are used by controller 82 to determine the rotor position.

Figure 4:
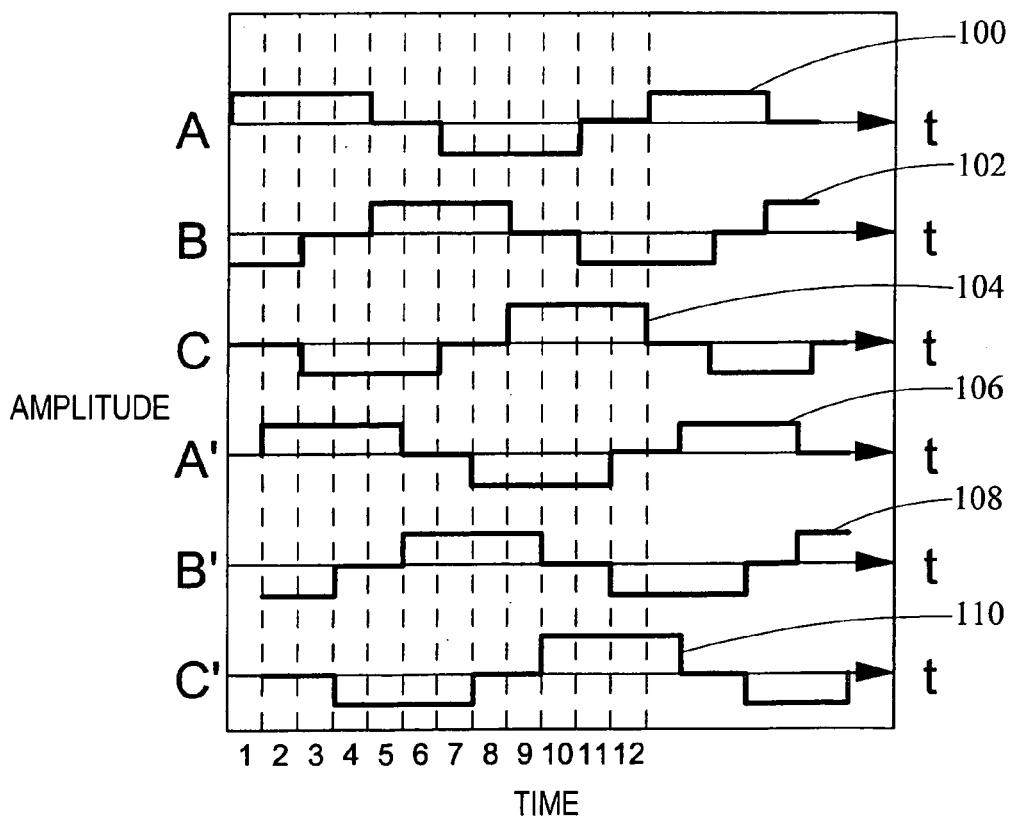
FIG. 4 is a timing diagram of a twelve step process for starting a six phase electric motor.

FIG. 4 illustrates a control scheme for a 6-phase machine (12-step control mode).

Lines 100, 102, 104, 106, 108, 110 represent the conducting states of the switching circuits 64, 66, 68, 74, 76, 78 respectively. Line 100 being representative of phase A, line 102 being representative of phase B, line 104 being representative of phase C of the first wye configuration 46. Similarly, line 106 being representative of A', line 108 being representative of B', line 110 being representative of C' and the second wye configuration 48.

Table Two is the look-up table for determining the step in the 12-step control mode from the measured signals V_AB, V_BC, and V_CA. Only induced voltages in the first wye configuration 46 are used to determine the control step for both the first and second wye configuration 46, 48. Each of the response voltages are compared to each other and zero volts to determine the control step indicative of the rotor position. Zero voltage is used as a response reference, although, the response reference could be another fixed value, if a DC voltage offset is added to this system.

TABLE TWO

Control Step Look-up table for 6-phase machine

| Condition | Control Step |
|---|---|
| V BC > V AB > 0 > V CA | 1 |
| V BC > 0 > V AB > V CA | 2 |
| V CA > V AB > 0 > V BC | 8 |
| V CA > 0 > V AB > V BC | 7 |
| V AB > V BC > 0 > CA | 12 |
| V AB > 0 > V BC > V CA | 11 |
| V CA > V BC > 0 > V AB | 5 |
| V CA > 0 > V BC > V AB | 6 |
| V AB > V CA > 0 > V BC | 9 |
| V AB > 0 > V CA > V BC | 10 |

TABLE TWO-continued

Control Step Look-up table for 6-phase machine

| Condition | Control Step |
|---|---|
| V BC > V CA > 0 > V AB | 4 |
| V BC > 0 > V CA > V AB | 3 |

Amplifiers 84, 86, 88, 90, 92, and 94 are configured to provide signals representative of inductance voltage between the stator windings 52, 54, 56 to a controller 20 such as a DSP (digital signal processor). Amplifier 84 is connected between stator winding 52 and stator winding 56 to produce a signal representative of the inductance voltage therebetween. Amplifier 86 is connected between stator winding 56 and stator winding 52 to generate a signal representative of the inductance voltage therebetween, in a polarity opposite of amplifier 84. Similarly, amplifier 88 and amplifier 90 are connected in opposite polarities, between stator winding 52 and stator winding 54 to provide a signal representative of the inductance voltage between stator winding 52 and stator winding 54. To provide a signal representative of the inductance voltage between stator winding 54 and stator winding 56, amplifier 92 and amplifier 94 are connected in opposite polarities across stator winding 54 and stator winding 56.

More logical comparisons are required to determine the step in a 6-phase machine with the 12-step control mode than the 6-step control mode of FIG. 2. However, the calculations required by Table Two may be readily implemented within the capability of an 8-bit microcontroller.

Figure 5:
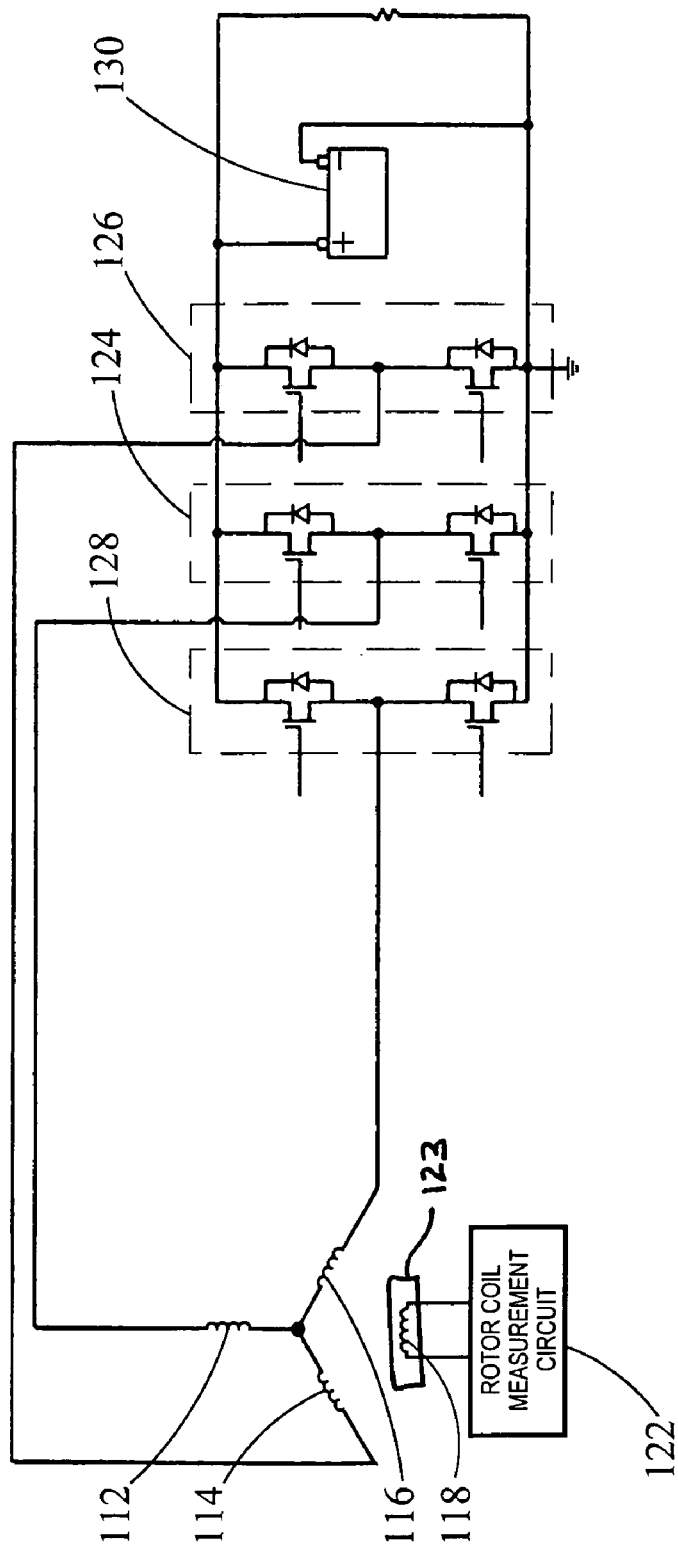
FIG. 5 is a schematic view of another embodiment of a system for determining a start position angle of an electric machine.

Now referring to FIG. 5, the pulse of AC current can alternatively be provided to the stator windings 112, 114, 116 and the induced voltages measured in the rotor coil 118. By reciprocity, the induced voltage will be the same as if pulse of AC currents are provided to the stator windings. Since there is a fly-back diode in parallel with the rotor coil 118, an additional switch may be required in the rotor coil measurement circuit 122 to facilitate the measurements.

Each stator winding 112, 114, 116 is connected to a corresponding switching circuit 124, 126, 128. Each of the switching circuits 124, 126, 128 are connected to a battery 130 to supply electrical power and energize the stator windings 112, 114, 116. To determine the rotor position, each of the gate switching circuits 124, 126, 128 sequentially energizes its corresponding stator winding 112, 114, 116. For example, first switching circuit 124 provides a current pulse to stator winding 112 and the induced voltage in the rotor coil 118 is measured by the rotor coil measurement circuit 122. The coil measurement circuit 122 may include amplifier and a DSP as provided in the previous embodiments. Next, switching circuit 126 provides a current pulse to stator winding 114 and the induced voltage is measured in the rotor coil 118 by the rotor coil measurement circuit 122. Then, the switching circuit 128 provides a current pulse to stator winding 116, and again, the induced voltage is measured in the rotor coil 118 by the rotor coil measurement circuit 122. The rotor coil measurement circuit 122 then determines the rotor position based on equations 4-6.

In another embodiment using a configuration similar to the 3-phase configuration of FIG. 1 or the 6-phase configuration of FIG. 3, a pulsed current in one of the stator windings and measure induced voltages in other stator windings. In the instance of FIG. 1, a pulse is introduced into stator winding 12 rather than the rotor winding 18. The induced voltages between the stator windings are then measured and compared. Typically the mutual inductances among stator windings are small and the induced voltages are small (about 100 times smaller than mutual inductances between stator windings and rotor coil). Therefore, the measured data will have a large noise to signal ratio and special filtering or DSP chips may be required to derive reliable information from the measured data.

Utilizing the embodiments provided, the initial rotor angle position can be estimated so that the initial control step of an electric machine using switches to control phase currents can be initiated. By implementing the conditions described in Table One (three phase) or Table Two (six phase), rotating the crankshaft in wrong direction during engine crank can be avoided. Once the initial rotor position is determined, conventional ramp-up starting processes can be adapted to start the electric machine.

When the initial control step is correctly determined, the initial rotor angle position may be estimated more accurately to reduce the period of ramp-up starting processes. Table Three provides a method for more accurate estimation of the initial rotor angle. The relationship among V_AB, V_BC, and V_CA can be simplified with different linear approximations in different control steps. Table Three only provides the concept of this linearization for step 1 and detailed logic comparison for each step is not provided in Table Three. Similar calculations can be implemented for the other control steps. The number of logic comparisons accuracy of the rotor angle position estimation will increase as the number of comparisons increase.

TABLE THREE

Detailed Rotor Angle Estimation for 3-phase machine

| Condition | Control Step | Further Estimated Rotor Angle (from beginning of step 1, Electric Degree) |
|---|---|---|
| V BC > V AB > 0 > V CA | 1 | 0–30, = −30*(1 − V AB/V BC) |
| V BC > 0 > V AB > V CA | 1 | 30–60, = 60 −30*(1 − V AB/V CA) |

With the method in Table Three, the initial rotor angle position for a 6-phase dual wye machine can be determined within about 5 electric degrees (less than 1 mechanical degree).

As a person skilled in the art will readily appreciate, the above description is meant as an illustration of the principles this invention. This description is not intended to limit the scope or application of this invention in that the invention is susceptible to modification, variation and change, without departing from spirit of this invention, as defined in the following claims.

We claim:

1. A system for determining a position angle of an electric machine having a rotor and a stator, the system comprising:
   a plurality of windings;
   a circuit configured to create a pulse current in at least three stator windings of the plurality of windings;
   at least one voltage sensor, each sensor being configured to sense a pulse field response in a corresponding winding of the plurality of windings;
   a processor in communication with the at least one sensor and configured to determine the position angle of the rotor based on the pulse field response; and
   wherein the processor is configured to determine the position angle based on the relationship
   F_A=I_field*L_FA=I_field*L*sin(theta),
   F_B=I_field*L_FB=I_field*L*sin(theta−120°),
   F_C=I_field*L_FC = I_field*L*sin(theta−240°),
   where: F_A, F_B, F_C are flux linkage of phase A, B, C; L_FA, L_FB, L_FC are mutual inductances between rotor coil and phase A, B, C; I_field is rotor coil field current; L is a constant; theta is the rotor angle position.

2. The system according to claim 1, wherein the at least one stator winding includes at least three windings.

3. The system according to claim 1, wherein the processor is configured to determine the position angle based on a comparison of the pulse field response between each of the plurality of stator windings.

4. The system according to claim 1, wherein the processor is configured to determine the position angle based on a comparison of the pulse field response between each of the plurality of stator windings and a response reference.

5. The system according to claim 1, wherein the at least one winding includes a winding from each phase of the electric machine.

6. The system according to claim 1, wherein the corresponding winding is a rotor winding.

7. The system according to claim 1, wherein the corresponding winding is a stator winding.

8. A system for determining a position angle of an electric machine having a rotor and a stator, the system comprising:
   a plurality of windings;
   a circuit configured to create a pulse current in at least one rotor winding of the plurality of windings;
   a plurality of voltage sensors, each sensor being configured to sense a pulse field response in a corresponding stator winding of the plurality of windings; and
   a processor in communication with the at least one sensor and configured to determine the position angle of the rotor based on the pulse field response wherein the processor is configured to determine the position angle based on the relationship
   F_A=I_field*L_FA=I_field*L*sin(theta),
   F_B=I_field*L_FB=I_I_field*L* sin(theta−120°),
   F_C=I_field*L_FC=I_field*L*sin(theta240°), where: F_A, F_B, F_C are flux linkage of phase A, B, C; L_FA, L_FB, L_FC are mutual inductances between rotor coil and phase A, B, C; I_field is rotor coil field current; L is a constant; theta is the rotor angle position.

9. The system according to claim 8, wherein the processor is configured to determine the position angle based on a comparison of the pulse field response between each of the plurality of stator windings.

10. The system according to claim 8, wherein the processor is configured to determine the position angle based on a comparison of the pulse field response between each of the plurality of stator windings and a response reference.

11. A system for determining a position angle of a claw pole electric machine having a rotor and a stator, the system comprising:
   a plurality of windings;
   a circuit configured to create a pulse current in at least three stator windings of the plurality of windings;
   at least one voltage sensor, each sensor being configured to sense a pulse field response in a corresponding winding of the plurality of windings;
   a processor in communication with the at least one sensor and configured to determine the position angle of the rotor based on the pulse field response; and
   wherein the processor is configured to determine the position angle based on the relationship
   F_A=I_field*L_FA=I_field*L*sin(theta), F_B=I_field*L_FB=I_field*L*sin(theta−120°),
F_C=I_field*L_FC=I_field*L*sin(theta−240°), where: F_A, F_B, F_C are flux linkage of phase A, B, C; L_FA, L_FB, L_FC are mutual inductances between rotor coil and phase A, B, C; I_field is rotor coil field current; L is a constant; theta is the rotor angle position.

12. The system according to claim 11, wherein the corresponding winding is a rotor winding.

13. The system according to claim 11, wherein the corresponding winding is a stator winding.

* * * * *

UNITED STATES PATENT AND TRADEMARK OFFICE
CERTIFICATE OF CORRECTION

PATENT NO. : 7,246,029 B2 Page 1 of 1
APPLICATION NO. : 10/936963
DATED : July 17, 2007
INVENTOR(S) : Hanyang B. Chen et al.

It is certified that error appears in the above-identified patent and that said Letters Patent is hereby corrected as shown below:

<u>On the Title Page</u>

In column 1, item (73), before "Visteon Global" delete "f;".

Signed and Sealed this

Ninth Day of October, 2007

JON W. DUDAS
*Director of the United States Patent and Trademark Office*